(12) United States Patent
Okuyama et al.

(10) Patent No.: US 7,466,368 B2
(45) Date of Patent: Dec. 16, 2008

(54) IMAGE PROJECTION APPARATUS AND ADJUSTING METHOD USED FOR THE SAME

(75) Inventors: Atsushi Okuyama, Tokorozawa (JP); Makoto Takahashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 11/228,605

(22) Filed: Sep. 16, 2005

(65) Prior Publication Data

US 2006/0066813 A1    Mar. 30, 2006

(30) Foreign Application Priority Data

Sep. 17, 2004    (JP)    .............................. 2004-272407

(51) Int. Cl.
G02F 1/1335    (2006.01)

(52) U.S. Cl. .......................... 349/5; 349/117; 349/113; 349/106; 353/31

(58) Field of Classification Search ................. 349/117, 349/118, 119, 106, 113, 5; 353/31, 84
See application file for complete search history.

(56) References Cited

U.S. PATENT DOCUMENTS

| | | | |
|---|---|---|---|
| 5,327,270 A | 7/1994 | Miyatake | |
| 6,501,523 B2 | 12/2002 | Hirota et al. | |
| 2003/0025879 A1 | 2/2003 | Ishii | |

FOREIGN PATENT DOCUMENTS

| | | |
|---|---|---|
| JP | 7-38050 | 4/1995 |
| JP | 2001-228534 | 8/2001 |
| JP | 2002-62583 | 2/2002 |
| JP | 2002-207213 | 7/2002 |
| JP | 2003-35886 | 2/2003 |
| JP | 2004-12864 | 1/2004 |

*Primary Examiner*—Thoi V Duong
(74) *Attorney, Agent, or Firm*—Morgan & Finnegan LLP

(57) ABSTRACT

An image projection apparatus includes a first reflection type liquid crystal display device for modulating and reflecting red light, a second reflection type liquid crystal display device for modulating and reflecting green light, a third reflection type liquid crystal display device for modulating and reflecting blue light, the image projection apparatus projecting colored light made of the red, green and blue lights from the first to third reflection type liquid crystal display devices, a first 1/4 wave plate provided on an optical path of the red light, a second 1/4 wave plate provided on an optical path of the green light, and a third 1/4 wave plate provided on an optical path of the blue light, a direction of a fast axis of the third 1/4 wave plate being different from a direction that minimizes leakage light of the blue light.

9 Claims, 6 Drawing Sheets

PRIOR ART

IMAGE PROJECTION APPARATUS AND ADJUSTING METHOD USED FOR THE SAME

BACKGROUND OF THE INVENTION

The present invention relates generally of? an image projection apparatus, such as a liquid crystal projector ("LCP"), which uses a reflection type liquid crystal display ("LCD") device, and more particularly to an adjustment method of a 1/4 phase or wave plate.

Due to the recent spread image projection apparatuses, such as LCPs, high-quality image projection apparatus have been increasingly demanded. The recent polarization type LCP modulates illumination light from a lamp at a reflection type LCD device or reflection type liquid crystal panel, analyzes the modulated light at a polarization beam splitter ("PBS"), and introduces the analyzed light to a projection optical system. In order to improve the contrast of a colored image, a 1/4 phase or wave plate is arranged between the PBS and the reflection type LCD device. See, for example, Japanese Patent Publication, Application No. 2004-12864.

This prior art reference splits the optical path of the white light from the lamp into two optical paths. The first optical path introduces the first colored light to a first PBS, and the second optical path introduces second and third colored lights to a second PGS. A third PBS synthesizes outputs from these two PBSs. Red, green and blue ("RGB") may be arbitrarily selected from among the first to third colored lights.

Other prior art include Japanese Patent Publications, Application Nos. 2001-228534, 2002-062583, 2002-207213, and 2003-035886, and Japanese Patent Publication No. 07-038050.

The conventional LCP suffers image degradations due to the leakage light. A description will now be given of the "leakage light." For example, assume a reflection type LCD device that rotates a polarization direction of the light to be projected onto a screen by approximately 90° (but maintains the polarization direction of the light in displaying black) and maintains the polarization direction of the light that is not to be projected onto the screen. In this reflection type LCD device, the "leakage light" is the light that is projected onto the screen from among the lights incident upon the area that is controllably prohibited to introduce the light to the screen side. In other words, the "leakage light" is light that is projected onto the screen even when the polarization direction is so controlled in the reflection type LCD device that the reflected light does not enter the screen.

The above prior art reference proposes to adjust the 1/4 wave plates such that the contrast is maximum or the leakage light intensity is minimum.

However, it is difficult to eliminate the leakage light completely. In particular, use of a color-selecting phase plate would increase the leakage light intensity on an optical path of a color or the light in a specific wave range, to which the color-selecting phase plate is applied. Then, the leakage light ratios among the RGB may possibly differ: Black is tinted with a color of the light having the largest leakage light intensity and that color is different from white. Here, the color-selecting phase plate is serves to rotate, by 90°, a polarization direction of the light in a predetermined wave range in the visible light wave range, and maintain the polarization direction in other wave ranges.

Tinted black, such as magenta black, can be electrically converted into nearly black. FIG. 7 schematically shows a screen of the LCD device in this method. A screen 10 has an effective part or area 12 that displays an image by electrically controlling the liquid crystal and modulating the incident light, and a peripheral part or area 14 that encloses the effective part 12 and does not electrically modulate the liquid crystal. A transmission type LCD device would not project an image on the peripheral part 14 but project an image on the effective part 12 onto the final screen, since the peripheral part 14 is outside the effective area 12 in the LCD device and blocks all the lights in principle. However, the reflection type LCD device would project the peripheral part 14 onto the final screen, because it reflect part of the light incident upon the peripheral part 14 to the projection optical system, although the peripheral part 14 is outside the effective part 12. The electrically black convertible area is an area corresponding only to the effective part 12. Thus, after the electric black conversion, black is displayed or projected on the area corresponding to the effective part 12. However, the peripheral part 14 remains, for example, in reddish or magenta black (due to a comparatively large amount of the reddish leakage light), although it may, of course, be greenish or bluish black. However, a difference in black between the effective part 12 and the peripheral part 14 stands out. In particular, when the peripheral part 14 is in magenta black and the effective part 12 displays black or dark images, magenta black in the peripheral part 14 is undesirably stressed.

BRIEF SUMMARY OF THE INVENTION

The present invention is directed to a high-quality image projection apparatus that uses a reflection type LCD device, and an adjustment method used for it.

An image projection apparatus according to one aspect of the present invention includes a first reflection type liquid crystal display device for modulating and reflecting red light, a second reflection type liquid crystal display device for modulating and reflecting green light, a third reflection type liquid crystal display device for modulating and reflecting blue light, the image projection apparatus projecting colored light made of the red, green and blue lights from the first to third reflection type liquid crystal display devices, a first 1/4 wave plate provided on an optical path of the red light, a second 1/4 wave plate provided on an optical path of the green light, and a third 1/4 wave plate provided on an optical path of the blue light, a direction of a fast axis of the third 1/4 wave plate being different from a direction that minimizes leakage light of the blue light.

An image projection apparatus according to another aspect of the present invention includes first to third reflection type liquid crystal display devices for selectively providing light incident upon a pixel within an effective area with a phase difference based on an input image signal, and for providing light incident upon an area outside the effective area with a predetermined phase difference irrespective of the image signal, the first reflection type liquid crystal display device being used for red light, the second reflection type liquid crystal display device being used for green light, and the third reflection type liquid crystal display device being used for blue light, an illumination optical system for separating a color of light from a light source into the red light, the green light and the blue light, and for illuminating each of the first to third reflection type liquid crystal display devices with a corresponding one of the red light, the green light and the blue light, and a projection optical system for synthesizing and projecting optical paths from the first to third reflection type liquid crystal display devices. In one embodiment, where each of first, second and third leakage light ratios is defined as a ratio of light reflected on the area outside the effective area of a corresponding one of the first, second and third reflection type liquid crystal display devices and projected by the projection optical system, to light incident upon the area outside the effective area of the corresponding one of the first, second and third reflection type liquid crystal display devices, the third leakage light ratio is greater than each of the first and second leakage light ratios. In another embodiment, on a surface on which the projection optical system projects an image, chromaticity corresponding to the area outside the effective area has an x coordinate that is 0.3 or smaller on an xy chromaticity coordinate system.

An adjustment method according to another aspect of the present invention used for adjusting first to third 1/4 wave plates in an image projection apparatus that forms a colored image and includes a first reflection type liquid crystal display device for modulating and reflecting red light, a second reflection type liquid crystal display device for modulating and reflecting green light, a third reflection type liquid crystal display device for modulating and reflecting blue light, and the first 1/4 wave plate provided on an optical path of the red light, the second 1/4 wave plate provided on an optical path of the green light, and the third 1/4 wave plate provided on an optical path of the blue light, includes the steps of adjusting the first to third 1/4 wave plates such that leakage light of each of the red, green and blue lights can be minimum, and shifting the third 1/4 wave plate so that a direction of a fast axis of the third 1/4 wave plate can be different from a direction that minimizes leakage light of the blue light.

Other objects and further features of the present invention will become readily apparent from the following description of the preferred embodiments with reference to accompanying drawings.

DETAILED DESCRIPTION OF THE PREFERRED EMBODIMENTS

Figure 1:
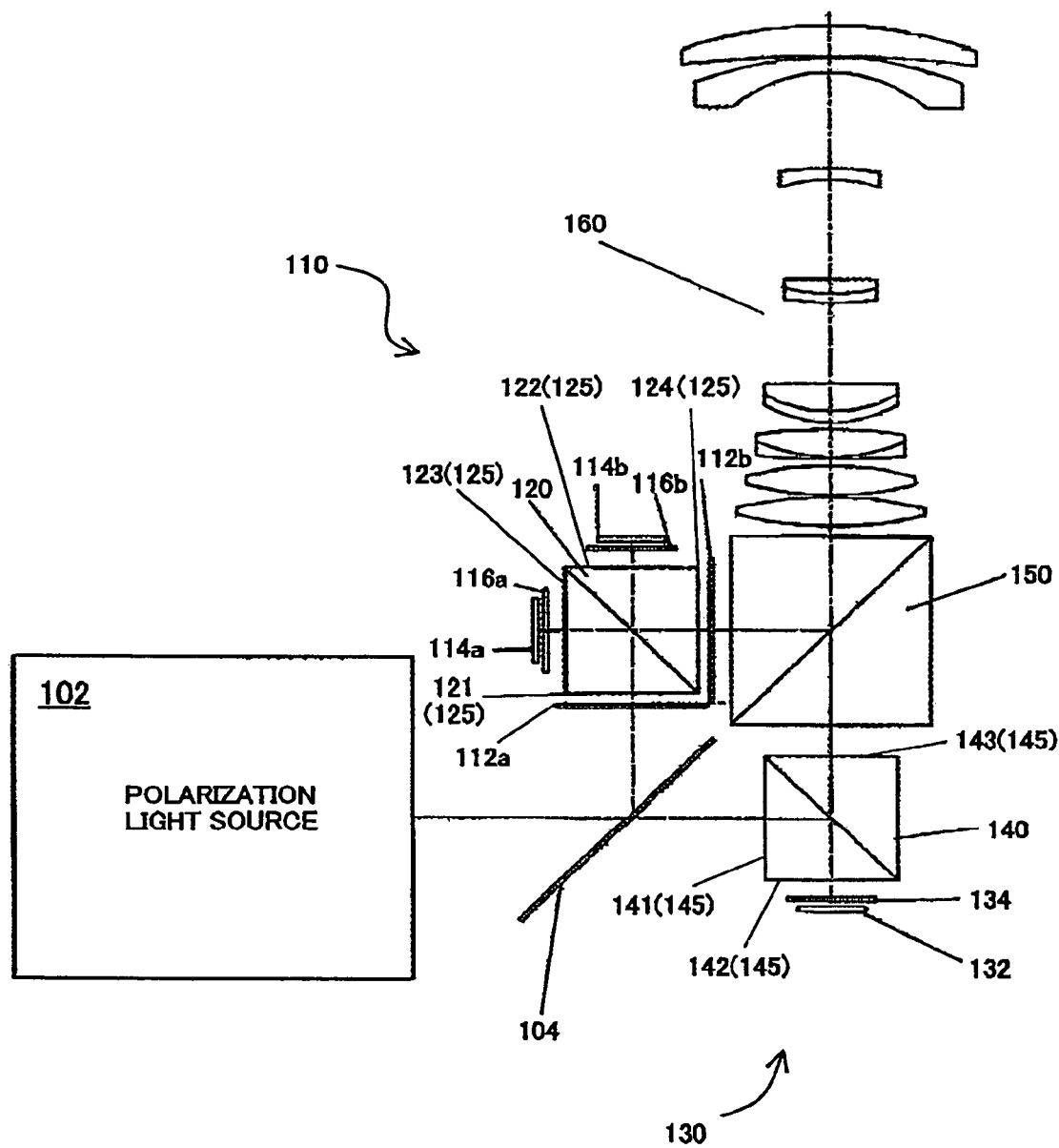
FIG. 1 is a schematic block diagram of an image projection apparatus according to one embodiment of the present invention.

A brief description of this embodiment will now be described. An image projection apparatus of this embodiment includes a first reflection type LCD device for modulating and reflecting red light, a second reflection type LCD device for modulating and reflecting green light, a third reflection type LCD device for modulating and reflecting blue light, a first 1/4 wave plate provided on an optical path of the red light, a second 1/4 wave plate provided on an optical path of the green light, and a third 1/4 wave plate provided on an optical path of the blue light. The image projection apparatus of this embodiment projects the lights from the first to third reflection type LCD devices, and the third 1/4 wave plate is shifted from a position that minimizes leakage light of the blue light in a direction that increases the leakage light of the blue light.

Preferably, the direction of the fast axis of the third 1/4 phase plate shifts by 1° or greater, preferably by 2.5° or greater, from the direction of the fast axis that minimizes the leakage light of the blue light. An angle is preferably within 5° between the direction of the fast axis of the third 1/4 phase plate and the direction of the fast axis that minimizes the leakage light of the blue light.

Each of the fast and/or slow axes of the third 1/4 phase plate has a rotational angle different from that of the first or second 1/4 phase plate by 1° or greater, preferably 2° or greater.

An angle is preferably within 1°, more preferably within 0.5° between each of directions of the fast and/or slow axes of the first and second 1/4 phase plates and a corresponding one of the directions of the fast and/or slow axes that minimize the leakage lights of the red and green lights.

Assume that a first fast-axis angle is defined as an angle between the direction of the fast axis of the first 1/4 phase plate and the direction of the fast axis that minimizes leakage light of the red light, a second fast-axis angle is defined as an angle between the direction of the fast axis of the second 1/4 phase plate and the direction of the fast axis that minimizes leakage light of the green light, and a third fast-axis angle is defined as an angle between the direction of the fast axis of the third 1/4 phase plate and the direction of the fast axis that minimizes leakage light of the blue light. Then, the third fast-axis angle is preferably greater than each of the first and second fast-axis angles. The third fast-axis angle is preferably greater than the first fast-axis angle by 1° or greater, preferably 2.5° or greater. The third fast-axis angle is preferably greater than the second fast-axis angle by 1° or greater, preferably 2.5° or greater.

The leakage light is the light guided to the projection optical system among the reflected lights from the peripheral part of the LCD device. The leakage light ratio is defined as a ratio of the (leakage) light intensity guided to the projection optical system or projected onto a target surface among the lights from the peripheral; part of the LCD device, to, the light intensity incident upon the peripheral part of the LCD device. Of course, the leakage light within the effective area of the LCD device may be considered.

An image projection apparatus may include first to third reflection type LCD devices for selectively providing light incident upon a pixel in an effective area with a phase difference (such as 0° and 90°) based on an input image signal, and for providing light incident upon the peripheral part with a predetermined phase difference (such as preferably one between 1° and 10°, although it may, be 0°) irrespective of the image signal, the first reflection type LCD device being used for red light, the second reflection type LCD device being used for green light, and the third reflection type LCD device being used for blue light, an illumination optical system for separating a color of the light from a light source into the red light, the green light and the blue light, and for illuminating each of the first to third reflection type LCD devices with a corresponding one of the red light, the green light and the blue light, and a projection optical system for synthesizing and projecting optical paths from the first to third reflection type LCD devices. In one embodiment, under the previously defined leakage light ratio, the third leakage light ratio is greater than each of the first and second leakage light ratios. In another embodiment, on a surface on which the projection optical system projects an image, chromaticity corresponding to the peripheral part has an x coordinate that is 0.3 or smaller, preferably 0.25 or smaller, on the xy chromaticity coordinate System.

Referring now to FIG. 1, a description will be given of an image projection apparatus of one embodiment according to the present invention. Here, FIG. 1 is a schematic block diagram of a LCP 100. The LCP 100 includes, as shown in FIG. 1, a polarization light source 102, a dichroic mirror 104, light generators 110 and 130, a light synthesizing prism 150, and a projection optical system 160. The "polarization light source," as used herein, may be a combination of a light source that emits a non-polarized light, and a unit that converts the non-polarized light from the light source to a linearly polarized light, such as a polarization conversion element and a polarizing plate or, of course, a light source that emits a linearly polarized light.

The polarization light source 102 serves to introduce the illumination light in a predetermined polarization state to the dichroic mirror 104. The polarization light source 102 includes a lamp that includes, along an optical path from the light source to the projection optical system 160, a light emitting part that emits the white light of a continuous spectrum, and a reflector that reflects the light emitted from the light emitting part, as disclosed in Japanese Patent Application, Publication No. 2002-207213. The polarization light source 102 uses an afocal system on a color-separating surface to compress, the light generated from the light emitting part, and reflected by the reflector. The color-separating surface is a plane that contains the paper surface shown in FIG. 1 and plural optical paths for different colors into which the optical path is separated by using the dichroic mirror 104, the PBS 120, etc. In a predetermined plane that is perpendicular to the color-separating surface and contains an optical axis, the polarization light source 102 is arranged along the predetermined plane. The polarization light source 102 includes a first integrator with plural lenses arranged in a matrix, preferably rectangular or cylindrical lenses, each having refractive power, within the predetermined plane, and a second integrator with plural lenses that correspond to the plural lenses of the first integrator and each have refractive power within the predetermined plane. The optical axis contains the light perpendicularly incident upon the optical axis of the reflector and/or the center of the effective part of each reflection type LCD device. The polarization light source 102 further includes a polarization conversion element that converts non-polarized light from the light source into polarized light, a condenser lens, a deflection mirror. Preferably, the polarization conversion element uses an array of plural polarization conversion elements arranged along the arrangement directions of the plural lenses in the first and second integrators. The "integrator," as used herein, may be a cylinder lens array having plural cylinder lenses that have powers in a predetermined direction and are one-dimensionally arranged in the predetermined direction, or a toric lens array having plural one-dimensionally or two-dimensionally arranged toric lenses, or a lens array having plural two-dimensionally arranged, rotationally symmetrical lenses.

The dichroic mirror 104 is a color-separating mirror that reflects the visible light in a specific wave range, and transmits the light in other wave ranges. The dichroic mirror 104 of this embodiment reflects the light in a wave range of the red (R) light with a wavelength between about 590 and 650 nm, and the blue (B) light with a wavelength between about 430 and 495 nm, and transmits the light in the wave range of the green (G) light. Thus, this embodiment separates the G light from the R and B lights, because the G light has large spectrum luminous efficiency, which is a likelihood of perception for the human eyes.

The light generator 110 introduces the RB lights in predetermined polarization states to the light synthesizing prism 150. The light generator 110 includes color-selecting phase plates 112a and 112b, reflection type LCD devices 114a and 114b, 1/4 phase plates 116a and 116b, and the PBS 120.

The color-selecting phase plate 112a converts the polarization direction of the B light by 90°, and maintains the polarization direction of the R light. The color-selecting phase plate 112b converts the polarization direction of the R light by 90°, and maintains the polarization direction of the B light. The reflection type LCD device 114a modulates the incident R light and reflects an R image. The reflection type LCD device 114b modulates the incident B light and reflects a B image. Each of the 1/4 wave plates 116a and 116b converts linearly polarized light into elliptically or circularly polarized light, and the elliptically or circularly polarized light into the linearly polarized light. The 1/4 wave plate 116a is used for the R light, while the 1/4 wave plate 116b is used for the B light.

Figure 2:
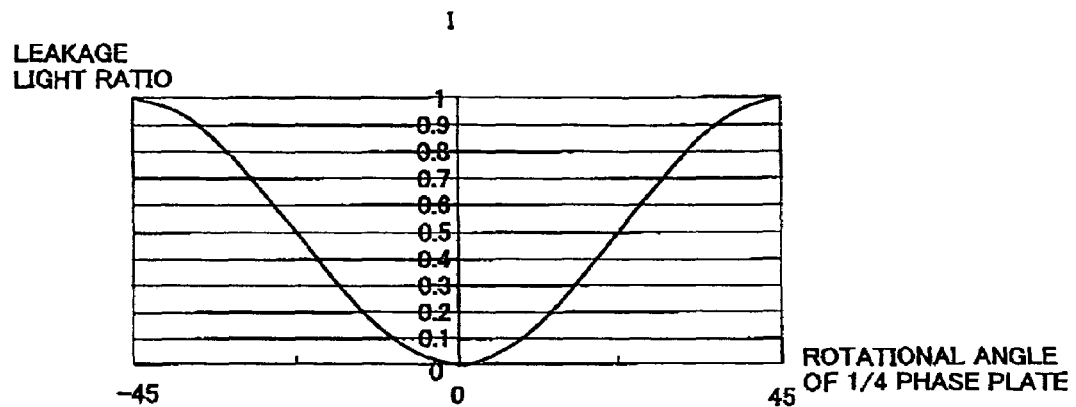
FIG. 2 is a graph showing a relationship between a rotation angle of a reflection type LCD device and the leakage light intensity in the image projection apparatus shown in FIG. 1.
Figure 3:
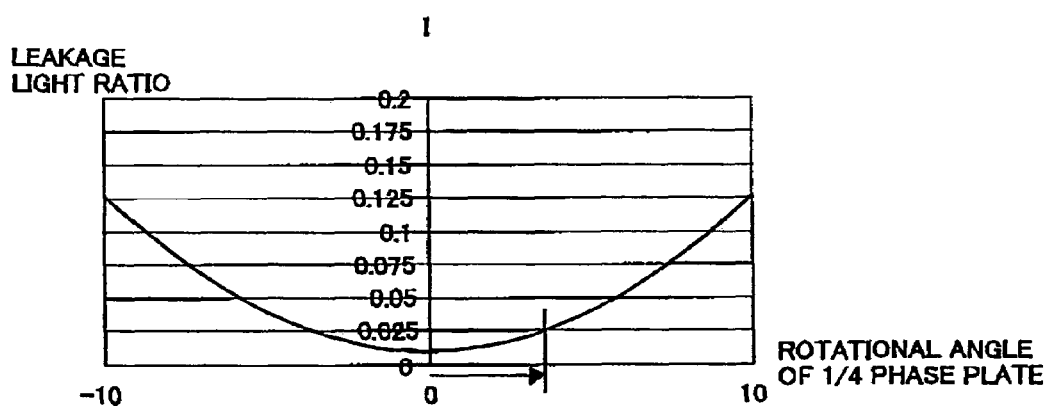
FIG. 3 is a graph showing a relationship between a rotation angle of a reflection type LCD device for the blue light and the leakage light intensity in the image projection apparatus shown in FIG. 1.

The 1/4 wave plate 116a is adjusted to an angle around the optical axis (of an optical path from the light source to the LCD device), which minimizes the leakage light of the R light. The angle from a minimum position is in a range between 0° and 1°, preferably between 0° and 0.5°. An angle around the optical axis of the 1/4 wave plate 116b is adjusted or shifted in a direction that increases the leakage light from a position that minimizes the leakage light of the B light. The angle is between 1° and 10°, preferably between 2° and 10°. FIG. 2 shows a relationship between the rotational angle of the 1/4 wave plate (around the optical axis or an angle relative to the normal of the color-separating plane) and the leakage light intensity. The abscissa axis denotes the rotational angle of the 1/4 wave plate, and the ordinate axis denotes the leakage light ratio. The leakage light ratio is defined as 0 when no leakage light occurs or when ideal black is displayed if the LCD device is controlled to display black. In addition, the leakage light ratio is defined as 1 when all the lights are projected or leaked if the LCD is controlled to display black. As illustrated, the leakage light intensity is adjustable by adjusting the rotational angle of the 1/4 wave plate. The rotational angle of the 1/4 wave plate 116a is, for example, about 1° after black is adjusted. Therefore, the rotational angle of the 1/4 wave plate 116b is increased in an arrow direction in FIG. 3 by several degrees starting from 1°, where FIG. 3 has the same ordinate and abscissa axes as FIG. 2. As a result, the fast axis of the 1/4 wave plate 116b has a different rotational angle from each of the fast axes of the 1/4 wave plates 116a and 134. Alternatively, the slow axis of the 1/4 wave plate 116b has a different rotational angle from each of the slow axes of the 1/4 wave plates 116a and 134.

Figure 4:
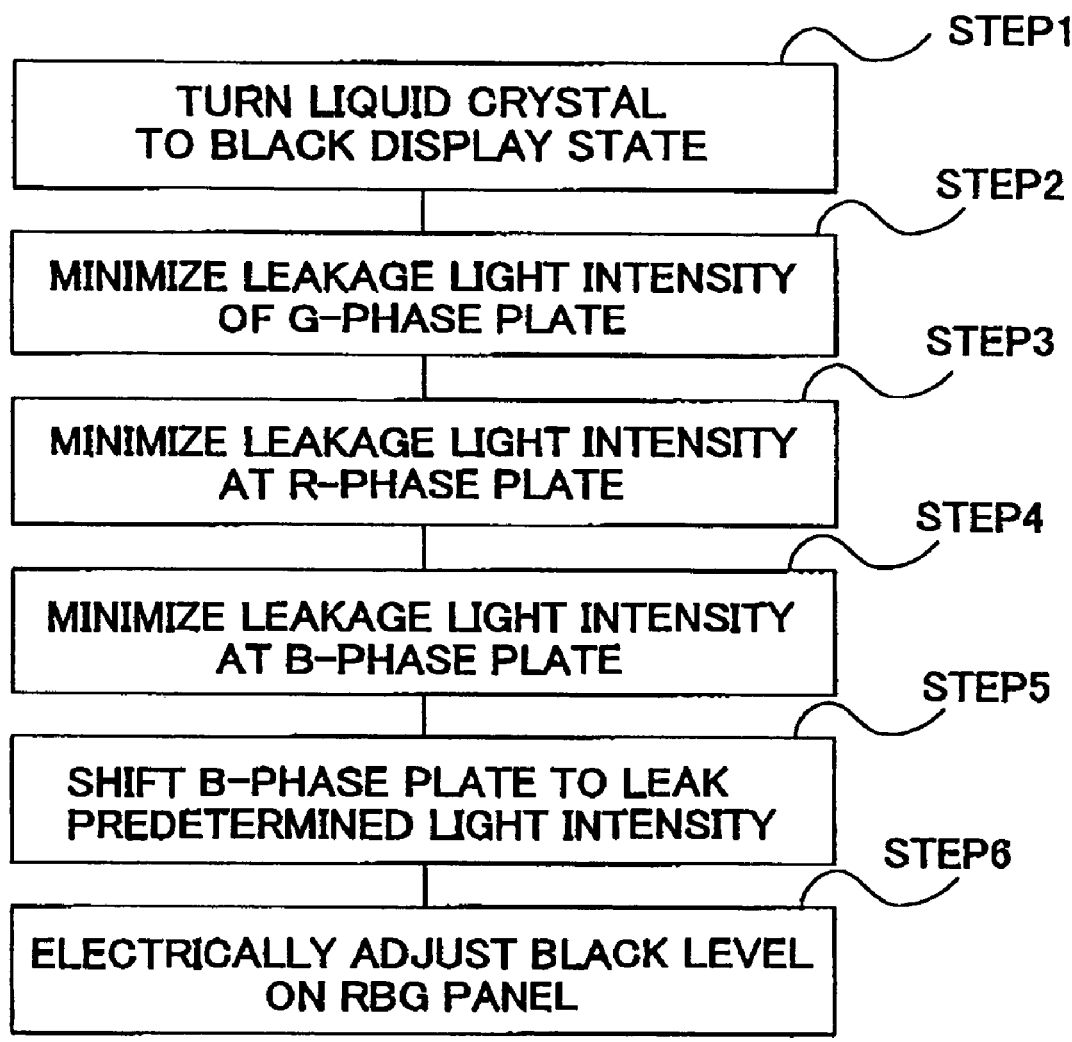
FIG. 4 is a flowchart for explaining an adjusting method of the 1/4 wave plate for the blue light in the image projection apparatus shown in FIG. 1.

Referring now to FIG. 4, a description will be given of an adjustment method of the 1/4 wave plate 116b.

Figure 5:
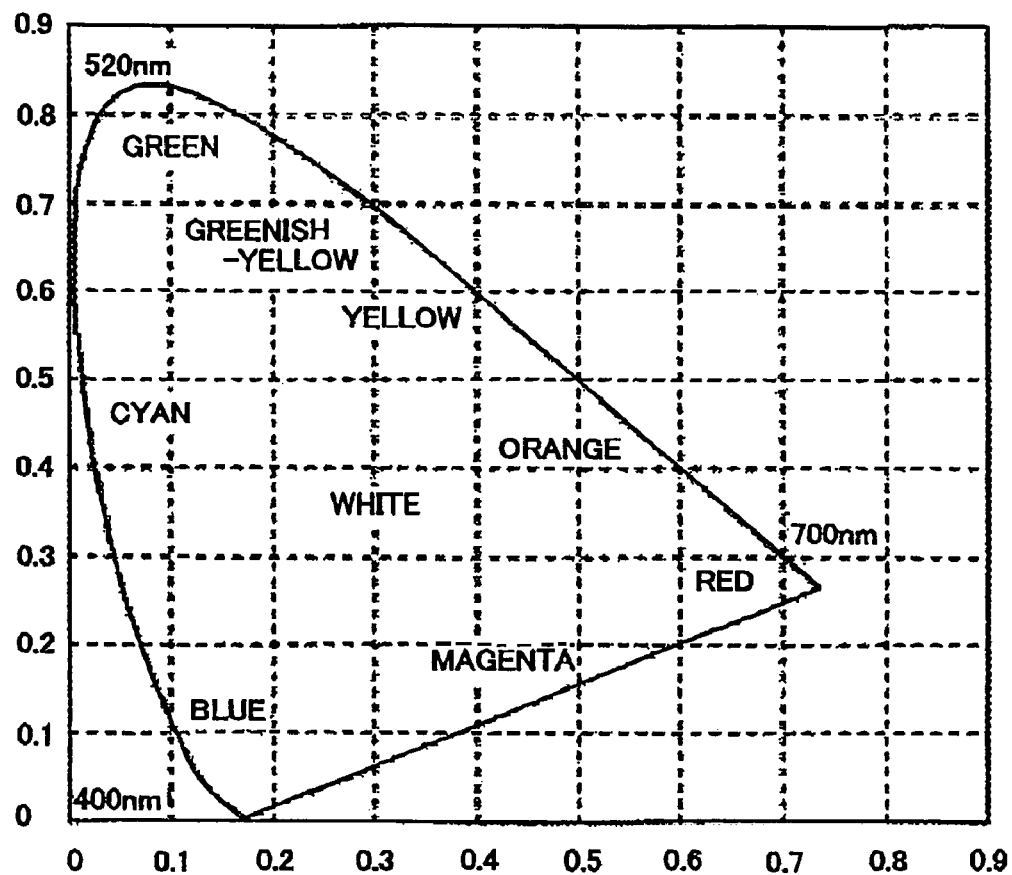
FIG. 5 is a chromaticity coordinate system used to adjust the image projection apparatus shown in FIG. 1.

Initially, the liquid crystal is turned into the black display state (step 1). Next, the 1/4 wave plate 134, which will be described later, is adjusted to minimize the leakage light intensity of the G light (step 2). Next, the 1/4 wave plate 116a is adjusted to minimize the leakage light intensity of the R light (step 3). Next, the 1/4 wave plate 116b is adjusted to minimize the leakage light intensity of the B light (step 4). The order of steps 2 to 4 is arbitrary. The leakage light intensity in the LCP 100 scatters, for example, within 5/1000 on the chromaticity coordinate system shown in FIG. 5.

Next, the 1/4 wave plate 116b is rotated by a predetermined amount so that the leakage light of the B light increases by a predetermined amount (step 5). The rotational angle of the 1/4 wave plate 116b at this time may be determined by detecting the leakage light intensity of the B light in the peripheral part 14. This embodiment monitors the chromaticity coordinate of an arbitrary point by measuring the effective part instead of measuring the peripheral part, and adjusts the x value on the chromaticity coordinate system to a predetermined value for fine adjustments. More specifically, this embodiment increases the leakage light intensity of the blue light so that the chromaticity of the blue light shifts in the −x-axis direction (approaching to blue) by 1/100 or greater, preferably 5/100 or greater on the xy chromaticity coordinate system shown in FIG. 5. For example, an x value of the chromaticity between 0.28 and 0.30 is increased up to a value between 0.27 and 0.29. Thus, the magenta black can be turned to more bluish black by moving the coordinate in the −x direction by 1/100 on the xy chromaticity coordinate system. In addition, a difference between black in the peripheral part 14 and black in the effective part 12 can be reduced down to the imperceivable or ignorable level for the human eyes.

Figure 6:
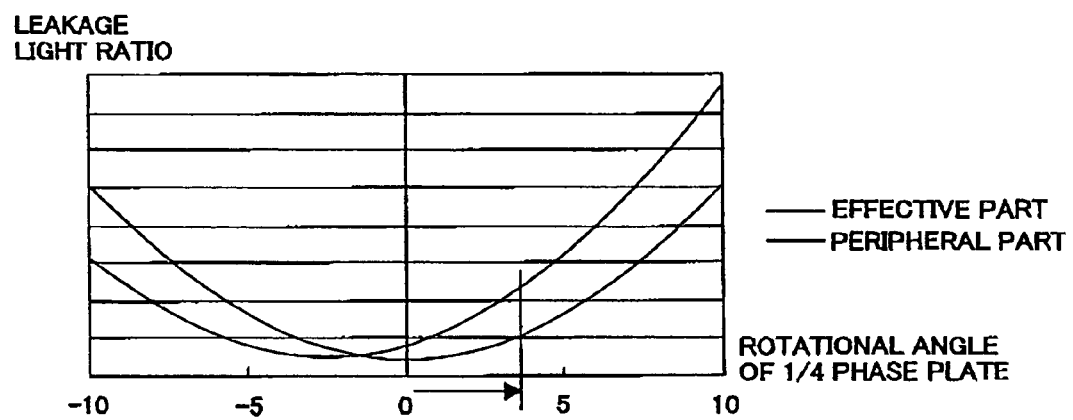
FIG. 6 is a graph showing the leakage light of the blue light in the effective and peripheral parts in the adjusted screen shown in FIG. 4.
Figure 7:
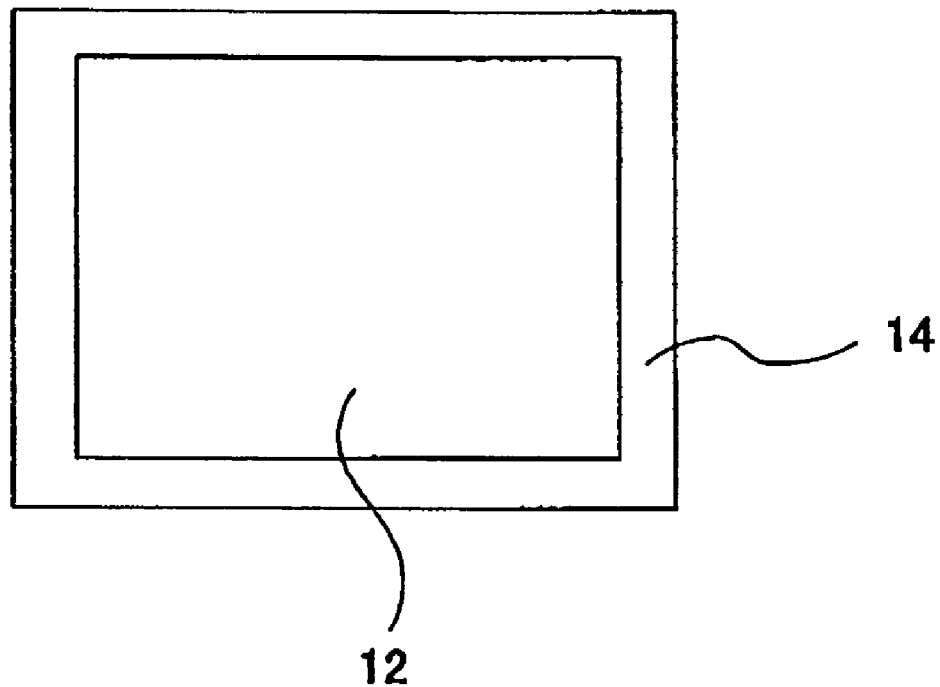
FIG. 7 is a plane view of a screen of a reflection type LCD device in the image projection apparatus.

Lastly, the black levels of the reflection type LCD devices 114a, 114b and 132 are electrically adjusted (step 6). FIG. 6 shows a relationship between the leakage light of the blue light in the effective part 12 and the peripheral part 14 after the black level adjustment (step 6), where the abscissa axis denotes an rotational angle of the 1/4 phase plate from a position that minimizes the leakage light ratio, and the ordinate axis denotes the leakage light ratio. As illustrated, in order to make more bluish a frame (a periphery of the image projection position on the projection plane, such as a screen) without drastically increasing a rotational angle of the λ/4 plate, it is preferable to rotate the λ/4 plate in the plus direction. In other words, the rotational angle of the 1/4 phase plate is so adjusted that the leakage light ratio of the light in the blue wavelength region in the area corresponding to the effective part is lower than that in the area corresponding to the frame. This embodiment adjusts the direction of the fast or slow axis of the 1/4 wave plate 116b so that the leakage light intensity of the blue light in the area on the image projected plane corresponding to the peripheral part 14 is more than that of the blue light in the area on the image projection surface corresponding to the effective part 12. The 1/4 wave plate 116b is provided between the reflection type LED device 114b and the PBS 120. In other words, in particular at the frame position, the leakage light ratio of the blue light at the black display time is more than each of the leakage light ratios of the red and green light at the black display time, where the leakage light ratio of the blue, red, green lights at the black display time are ratios of the light intensity of the light projected to the screen (projection plane) to the incident light intensity upon the LCD device (or the light intensity of the light incident upon the λ/4 plate).

The PBS 120 transmits the p-polarized light and reflects the s-polarized light. The PBS 120 includes an end surface 121 that transmits the RB lights, an end surface 122 that transmits the B light to the reflection type LCD device 114b, an end surface 123 that transmits the R light to the reflection type LCD device 114a, and an end surface 124 that transmits the RB lights to be projected. Each of the end surfaces or light transmitting surfaces 121 to 124 has an antireflection coating 125 having a spectral reflection characteristic that has a minimum reflectance value in the red or blue wave range.

The light generator 130 introduces the G light in a predetermined polarized state to the light synthesizing prism 150, and includes the reflection type LCD device 132, 1/4 wave plate 134, and PBS 140.

The reflection type LCD device 132 modulates the incident light and reflects the G image. The 1/4 wave plate 134 converts linearly polarized light into elliptically or circularly polarized light, and the elliptically or circularly polarized light into the linearly polarized light. The 1/4 wave plate 134 is used for the G light, and adjusted to minimize or nearly minimize the leakage light of in the green wave range.

The PBS 140 transmits the p-polarized light, and reflects the s-polarized light. The PBS 120 includes an end surface 141 that transmits the G illumination light, an end surface 142 that transmits the G light to the reflection type LCD device 134, and an end surface 143 that transmits the G light to be projected. Each of the end surfaces or light transmitting surfaces 141 to 143 has an antireflection coating 145 having a spectral reflection characteristic that has a minimum reflectance value in the G wave range.

Since the polarization splitting performance of the PBS improves as an incident angle upon the polarization splitting film becomes small, it is preferable to make the PBSs 120 and 140 of a glass material having a refractive index of 1.6 or greater to the light having a wavelength of 587.6 nm This structure is effective, in particular, to a glass material having a low photo-elasticity that is lower than $0.03 \times e^{-6}$ N/mm$^2$ and a refractive index of 1.8 or greater to the light having a wavelength of 587.6 nm, preferably a refractive index of 1.83 or greater to all the lights in the wave range between 420 and 700 nm. In addition, the internal transmittance of a glass material having a thickness of 25 mm is preferably 90% or greater, more preferably 92.5% or greater, to the light in the wave range between 420 and 700 nm.

The light synthesizing prism 150 is a PBS that synthesizes two colored lights into one optical path. The incident surface of the light synthesizing prism 150 to the RB lights is provided with the antireflection coating 125, while the incident surface of the light synthesizing prism 150 to the G light is provided with the antireflection coating 145. Since the light from the light source 102 to the projection optical system 160 becomes the thinnest at the reflection type LCD devices 114a, 114b and 132, the PBSs 120 and 140 near the reflection type LCD devices 114a, 114b and 132 are made smaller than the color synthesizing prism 150.

The projection optical system or lens 160 projects a colored image onto a screen (not shown). The F-number of the projection optical system 160 is smaller than that of the illumination optical system, since there is an offset of the optical axis between the projection optical system 160 and the condenser optical system due to the diffractions and attachment errors of the reflection type LCD devices.

A description will be given of an operation of the LCP 100.

In the light from the polarization light source 102 that radiates the white light in a polarization state in a predetermined aligned direction, the dichroic mirror 104 reflects the B and R lights and transmits the G light.

The B and R rights reflected by the dichroic mirror 104 are incident upon the color-selecting phase plate 112a, and the B light enters as the p-polarized light the PBS 120 while the R light enters as the s-polarized light the PBS 120. The PBS 120 reflects the R light on its polarization splitting surface to the reflection type LCD device 114a, and transmits the B light on its polarization splitting surface to the reflection type LCD device 114b. As a result, the light is separated into two colored lights or the R and B lights.

The reflection type LCD device 114a modulates and reflects the R light. The s-polarized light component of the reflected R light is again reflected on the polarization splitting surface, returned to the light source side, and removed from the projected light. The p-polarized light component of the reflected R light transmits the polarization splitting surface, and is analyzed and projected.

The reflection type LCD device 114b modulates and reflects the B light. The p-polarized light component of the reflected B light is again reflected on the polarization splitting surface, returned to the light source side, and removed from the projected light. The s-polarized light component of the reflected B light transmits the polarization splitting surface of the PBS 120, and is analyzed and projected.

The synthesized RB light to be projected is incident upon the color-selecting phase plate 112b. The color-selecting phase plate 112b rotates the polarization direction of the R light, outputting the s-polarized lights of both the R and B lights. Then, the synthesized light enters the light synthesizing prism 150, and is synthesized with the G light when reflected on the polarization splitting surface.

In the optical path of the G light, the G light that passes the dichroic mirror 104 is incident as the s-polarized light upon the PBS 140, and reflected on the polarization splitting surface of the PBS 140 to the reflection type LCD device 132. The reflection type LCD device 132 modulates and reflects the G light. The s-polarized light of the reflected G light is again reflected on the polarization splitting surface, returned to the light source side, and removed from the projected light. The p-polarized light of the reflected G light passes the polarization direction of the PBS 140, and is analyzed and projected.

In the black display state, the direction of the slow or fast axis of the 1/4 wave plate 134 is adjusted to such a predetermined direction that the disturbance in the polarization direction, which would otherwise occur in the PBS 140 and the reflection type LCD device 132, is maintained as small as possible.

The light transmitting the PBS 140 is incident as the p-polarized light upon the color synthesizing prism 150, and then enters the projection optical system 160 after its unnecessary components are removed. The color synthesizing prism 150 synthesizes the RB lights emitted from the PBS 120 with the G light emitted from the PBS 140. The synthesized light is incident upon the projected optical system 160 and projected on the screen The antireflection coating 125 and 145 provide high-quality or high-contrast images on the screen.

As a result, the RGB projected lights are projected as single synthesized light by the projection optical system 160. In adjusting black in the projected image in the image projection apparatus, the electric black adjustment is available in the effective part of each LCD device, but unavailable outside the effective part, which does not form an image. The effective part of the LCD device is an area that actually forms an image, electrically controls the liquid crystal, and selectively modulates the incident light.

Accordingly, an adjustment to black formed by the RGB lights varies an angle around the optical axis of the slow or fast axis of the 1/4 wave plates 16a, 116b, and 134 each arranged on the optical path of a corresponding one of colors. More specifically, the blue light is intentionally leaked in order to prevent the area corresponding to the outside of the effective area from turning into reddish or greenish black in the black display state. In the black display time, the leakage light ratio of the blue light is made higher than that of the red light and/or that of the green light. The directions of the slow or fast axes of the 1/4 wave plates 116a and 134 on the red and green optical paths are adjusted to the directions that minimize the leakage lights of the red and green lights in the black display time. Any offsets between the directions of the slow or fast axes and the minimizing directions are maintained within 1°, preferably 0.5°. On the other hand, the direction of the slow or fast axis of the 1/4 wave plate 116b on the blue optical path is rotated around the optical axis and shifted by a predetermined angle (between 1° and 10°, preferably between 2.5° and 10°) from the direction that minimizes the leakage light of the blue light in the black display time.

Assume α is an angle between the normal 0f the above color-separating surface and the slow or fast axis of one of the 1/4 wave plates 116a and 134 arranged on the optical paths of the red and green lights. Also, assume that β is an angle between the normal of the above color-separating surface and the slow or fast axis of each of the 1/4 wave plate 116b arranged on the optical path of the blue light. This embodiment arranges the respective 1/4 wave plates so that the angle α is smaller than the angle β. The angle, α is preferably between 0° and 4°, more preferably between 0° and 2°. The angle β is preferably between 0° and 10°, more preferably greater than 2° and/or smaller than 5°.

According to the study of this inventor, the peripheral part 14 in bluish black is less conspicuous to human eyes associated with the effective part 12 adjusted in black than the peripheral part 14 in magenta black, and improves the image quality of the screen 10.

Further, the present invention is not limited to these preferred embodiments, and various variations and modifications may be made without departing from the scope of the present invention.

For example, the peripheral part of the LCD device for the blue light may provide a phase difference different from that provided by the peripheral area of the LCD devices for the red and green lights. In addition, even when the above angle α is equal to the above angle β, the leakage light ratio of the blue light can be made greater than that of each of the red and green lights. Preferably, the peripheral part of the LCD device for the blue light provides a phase difference greater by 3° or greater, more preferably by 5° or greater, than that provided by the peripheral part of the LCD devices for the red and green lights. This configuration allows more the blue light to leak, and provides similar effects to those of the above embodiment. Assume that A is a difference between a phase difference provided to the incident light by the effective part of the LCD device for the blue light in the black display time and a phase difference provided to the incident light by the peripheral part of the LCD device for the blue light in the black display time. In addition, assume that B is a difference between a phase difference provided to the incident light by the effective part of the LCD device for one of the red and green lights in the black display time and a phase difference provided to the incident light by the peripheral part of the LCD device for one of the red and green lights in the black display time. Then, one aspect of the present invention sets the difference A greater than the difference B. A difference between A and B is preferably between 1° and 10°, more preferably between 3° and 10°.

While the color synthesizing prism 150 of this embodiment introduces the RB reflected lights and the G transmitting light to the projection optical system 160, the present invention may introduce the RB transmitting lights and the G reflected light to the projection optical system. Alternatively, the B light may have a sole optical path, whereas the RG lights may be have a common optical path. A method that utlizes a cross prism may be used.

While this embodiment illustrates the image projection apparatus having the reflection type LCD devices corresponding to the red, green and blue wave ranges, the color of the light may be separated differently from red, green and blue. For example, almost the white light from the light source is separated into four colored lights in different wave ranges. Similar to the 1/4 wave plate for the blue light, the 1/4 wave plate arranged in the optical path of the light having the smallest wavelength may be adjusted so that the fast or slow axis of the 1/4 wave plate shifts from the direction that minimizes the leakage light ratio, by an angle of 1° or greater, preferably 2.5° or greater. More preferably, the leakage light ratio of the target light in the black display time is higher than that of the other colored lights.

This application claims a foreign priority based on Japanese Patent Application No. 2004-272407, filed Sep. 17, 2004, which is hereby incorporated by reference herein.

What is claimed is:

1. An image projection apparatus comprising:
    a first reflection type liquid crystal display device for modulating and reflecting red light;
    a second reflection type liquid crystal display device for modulating and reflecting green light;
    a third reflection type liquid crystal display device for modulating and reflecting blue light, said image projection apparatus projecting colored light made of the red, green and blue lights from said first to third reflection type liquid crystal display devices;
    a first 1/4 wave plate provided on an optical path of the red light;
    a second 1/4 wave plate provided on an optical path of the green light; and
    a third 1/4 wave plate provided on an optical path of the blue light, a direction of a fast axis of the third 1/4 wave plate being different from a direction that minimizes leakage light of the blue light.

2. An image projection apparatus according to claim 1, wherein a direction of a fast axis of the third 1/4 phase plate is shifted by 1° or greater from a direction of a fast axis which minimizes the leakage light of the blue light.

3. An image projection apparatus according to claim 1, wherein a direction of a fast axis of the third 1/4 phase plate is shifted by 2.5° or greater from a direction of a fast axis which minimizes the leakage light of the blue light.

4. An image projection apparatus according to claim 1, wherein an angle is within 5° between a direction of a fast axis of the third 1/4 phase plate and a direction of a fast axis which minimizes the leakage light of the blue light.

5. An image projection apparatus according to claim 1, wherein a fast axis of the third 1/4 phase plate has a rotational angle different from that of the first 1/4 phase plate.

6. An image projection apparatus according to claim 1, wherein a slow axis of the third 1/4 phase plate has a rotational angle different from that of the first 1/4 phase plate.

7. An image projection apparatus according to claim 1, further comprising;
    a projection optical system for synthesizing and projecting optical paths from the first to third reflection type liquid crystal display devices; and
    a polarization beam splitter for introducing light from a light source to the first to third reflection type liquid crystal display devices, and for the light reflected on the first reflection type liquid crystal display device to said projection optical system.

8. An image projection apparatus according to claim 1, wherein an angle is within 1° between each of directions of fast axes of the first and second 1/4 phase plates and a corresponding one of the directions that minimize the leakage lights of the red and green lights.

9. An image projection apparatus according to claim 1, wherein where a first fast-axis angle is defined as an angle between a direction of a fast axis of the first 1/4 phase plate and a direction of a fast axis that minimizes leakage light of the red light, a second fast-axis angle is defined as an angle between a direction of a fast axis of the second 1/4 phase plate and a direction of a fast axis that minimizes leakage light of the green light, and a third fast-axis angle is defined as an angle between a direction of a fast axis of the third 1/4 phase plate and a direction of a fast axis that minimizes the leakage light of the blue light, the third fast-axis angle is greater than each of the first and second fast-axis angles.

* * * * *